United States Patent [19]

Arnon et al.

[11] Patent Number: 4,864,590
[45] Date of Patent: Sep. 5, 1989

[54] APPARATUS AND METHOD FOR NOISE REDUCTION IN A DIGITAL LINE RECEIVER

[75] Inventors: Ephraim Arnon, Ottawa; Sami Aly, Kanata, both of Canada

[73] Assignee: Northern Telecom Limited, Montreal, Canada

[21] Appl. No.: 213,888

[22] Filed: Jun. 30, 1988

[30] Foreign Application Priority Data

Dec. 31, 1987 [CA] Canada ............................ 555729

[51] Int. Cl.$^4$ .......................... H04B 3/04; H04B 1/10
[52] U.S. Cl. ..................................... 375/14; 375/103; 333/18
[58] Field of Search ....................... 375/14, 11, 99, 76, 375/98, 101, 103; 333/18; 379/411; 370/32.1, 32

[56] References Cited

U.S. PATENT DOCUMENTS 3,792,356  2/1974  Kobayashi et al. .................... 375/14
4,727,543  2/1988  Bauer ................................... 375/14

Primary Examiner—Benedict V. Safourek
Assistant Examiner—Marianne Huseman
Attorney, Agent, or Firm—Michael M. Sakovich

[57] ABSTRACT

Apparatus for suppressing intersymbol interference and improving the signal-to-noise ratio in a digital line amplifier includes a filter with a fixed transfer function that couples equalized digital signals to a first differential input of a difference amplifier and substantially filters out high frequency random noise present in the signals to achieve signal-to-noise enhancement with consequent degradation of the signals by intersymbol interference. Subsequently, an output from the amplifier is sampled by a quantizer that produces a bit stream output of portions of the enhanced signals, excluding the intersymbol interference. Signals from the bit stream are then coupled to a fixed coefficient decision feedback equalizer having the same transfer function as the filter and are output therefrom as feedback signals to a second differential input of the amplifier such that the signals at both differential inputs are substantially equal in terms of intersymbol interference, thereby suppressing such interference in the amplifier output.

16 Claims, 3 Drawing Sheets

APPARATUS AND METHOD FOR NOISE REDUCTION IN A DIGITAL LINE RECEIVER

FIELD OF THE INVENTION

This invention relates to a digital line receiver adapted to enhance the signal-to-noise ratio of bipolar encoded pulses conducted along a telephone line while suppressing intersymbol interference in the pulses and, more particularly, to a digital line receiver in which such signal enhancement and interference suppression is achieved using filters and equalizers having fixed transfer function characteristics.

BACKGROUND OF THE INVENTION

Are conventionally in the form of bipolar encoded pulses which are also referred to as alternate mark inverted (AMI) encoded pulses. Pulse rates tend to be high, 2.56 Mb/s for example, and are frequently conveyed over standard twisted pair wiring which, although not well suited to the application, is commonly used because of its prevalence in telephone systems.

The communication of digital signals along any transmission path results in attenuation through conventional IR losses and in waveform distortion resulting from a filter effect by the transmission path. Additionally, impedance mismatches arising from mixed wire gauges and improper terminations result in echoes or reflections that blur the normally clear distinctions between ones and zeros in digital technology. Thus, in an AMI bit stream a digital zero following a digital +/- one may, on occasion, not reach a zero value due to reflected signals that may occupy the zero time slot. The difficulty of distinguishing between ones and zeros of a bit stream is referred to as intersymbol interference (ISI) which, under severe interference conditions, is commonly referred to as "closing of the eye". Conversely, reopening the eye refers to suppressing the ISI through various means known to those skilled in the art of telephony.

A discussion of the foregoing problem and a solution thereto using an adaptive equalizer is detailed in U.S. Pat. No. 4,545,060 Arnon which issued Oct. 1, 1985. Another form of adaptive equalizer is disclosed in U.S. Pat. No. 4,650,930 Hogeboom et al which issued Mar. 17, 1987.

Generally, the problems associated with ISI are exacerbated through a reduced signal-to-noise ratio, particularly where reflected signal strengths are large. U.S. Pat. No. 4,679,209 Hogeboom et al, issued July 7, 1987, discusses this problem and proposes a digital line receiver that is adapted to provide an improved signal-to-noise ratio of about 6 dB.

Adaptive equalizers nd digital line receivers, as typified by the aforenoted patents, comprise sophisticated line receiver designs in which an adaptive forward filter/equalizer reduces the noise bandwidth in a controlled manner whereas ISI is suppressed by an adaptive decision feedback equalizer (DFE) so as to reopen the eye after being initially closed by the filter.

In addressing the perceived problems of attenuation and ISI, other problems are introduced. One relates to timing recovery for establishing a clock at the receive end of the telephone line. Due to the high distortion intentionally generated by the filter of the prior art, it is not feasible to simply extract timing from the bit stream without engaging some complicated means of channel estimation or by transmitting special sequences or tones in the bit stream to aid timing recovery.

Another problem relates to the DFE which, because of the high distortion introduced by the filter, makes convergence of the DFE uncertain. A special protocol or a predetermined sequence of bits is required to initialize the system. Accordingly, any signal interruption requires a complete initialization procedure in order to be restarted.

As a result of the aforedescribed problems, the digital line receivers of the prior art require a high degree of intelligence which results in increased circuit complexity and inefficient utilization of transmission bandwidth.

SUMMARY OF THE INVENTION

A principal objective of the present invention is the provision of apparatus for reducing noise in a digital line receiver wherein signal enhancement is achieved using a filter having a fixed transfer function characteristic.

Another provision of the invention is a digital line receiver that is readily adapted to provide an enhanced signal-to-noise ratio using readily available components.

Still another provision of the invention is apparatus for reducing noise in a digital line receiver employing filters and a DFE, neither of which are adaptive.

Yet another provision of the invention is apparatus for reducing noise in a digital line receiver that does not rely on predetermined sequences of bits to assist in timing recovery.

Yet another provision of the invention is apparatus for reducing noise in a digital line receiver wherein such apparatus embodies simple circuit designs not requiring a high degree of built-in intelligence.

The problems associated with the prior art may be substantially overcome and the foregoing objectives achieved by recourse to my invention which, in one aspect, constitutes apparatus for reducing noise in a digital line receiver having an input connectable to a telephone line conducting a bit stream of digital signals, a line equalizer operably connected between the input and corresponding output of the receiver, and timing recovery means having at least one clock output and an input connected to receiver output. The apparatus comprises, in combination, amplifier means having first and second differential inputs and a difference output corresponding thereto, filter means connected between the receiver output and the first differential input for coupling equalized digital signals therebetween and substantially filtering out high frequency random noise present in the signals according to a predetermined fixed transfer function providing signal-to-noise enhancement of the signals and consequent degradation thereof by ISI, quantizer means operably responsive to the clock output and having a signal input connected to the difference output and an enhanced signal output producing a bit stream comprising a predetermined portion of individual ones of the enhanced signals excluding ISI, and decision feedback equalizer means operably defined by said transfer function and connected between the enhanced signal output and the second differential input for applying thereto feedback signals having ISI substantially equal to such interference at the first differential input, whereby ISI is substantially diminished in the enhanced signal output.

Another aspect of the invention relates to a method for reducing noise in a digital line receiver having an input connectable to a telephone line conducting a first bit stream of digital signals, a line equalizer operably connected between the input and corresponding output of the receiver, timing recovery means having at least one clock output and an input connected to the receiver output, and amplifier means having first and second differential inputs and a difference output corresponding thereto. The method comprises the steps of, coupling equalized digital signals from the receiver output to the first differential input and substantially filtering out high frequency random noise present in the signals according to a predetermined fixed transfer function providing signal-to-noise enhancement of the signals and consequent degradation thereof by ISI, sampling the digital signals at the difference output i at a rate corresponding to the clock output and producing a i second bit stream comprising a predetermined portion of individual ones of the enhanced signals excluding ISI, generating feedback signals having parameters defined by said transfer function and corresponding to the second bit stream, the feedback signals having ISI substantially equal to such interference at the first differential input, and coupling the feedback signals to the second differential input, whereby ISI is substantially diminished in the enhanced signal output.

BRIEF DESCRIPTION OF THE DRAWINGS

The invention will now be more particularly described with reference to embodiments thereof shown, by way of example, in the accompanying drawings wherein.

DESCRIPTION OF THE ILLUSTRATED EMBODIMENTS

Having regard to the illustrated embodiments of the invention and the descriptions thereof which follow, it will be observed that certain structural features are common throughout. In order that continuity of structure may be readily recognized in the various embodiments, like numerals are used to designate like structural features as they are described.

The embodiments of the invention hereinbelow described rely, in most instances, on block diagrams to illustrate various circuit elements and their respective functions. These block diagrams represent individual circuits that would be known to those skilled in the art of telephony, although not in the novel combinations to be disclosed. Accordingly, the following constitutes a sufficient description to such individuals for a comprehensive understanding of the best mode contemplated to give effect to the embodiments as disclosed and claimed herein.

Figure 1:
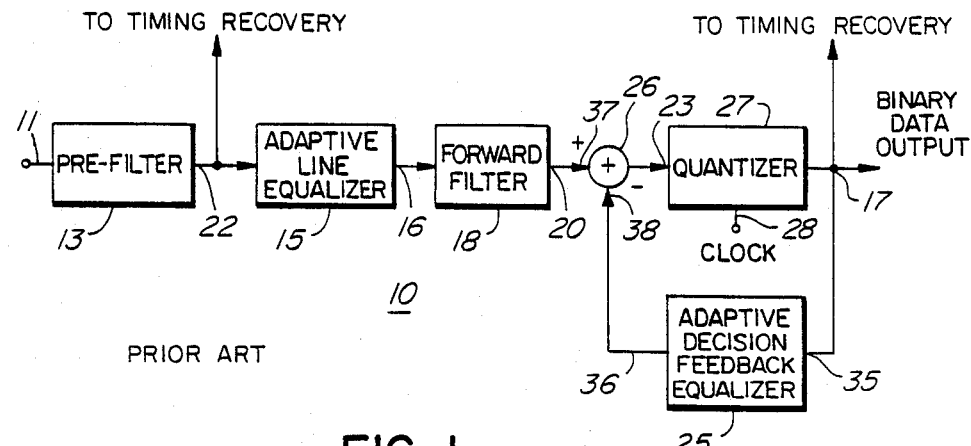
FIG. 1, is a block diagram of a known digital line receiver employing an adaptive equalizer and DFE to enhance the signal-to-noise ratio and to suppress ISI.

The current state of noise reduction in a digital line receiver is typically illustrated in block diagram form in FIG. 1. Since it is known that random noise in any band of frequencies tends to concentrate at the higher end of the band, the philosophy followed in the circuit of FIG. 1 is to chop off the high end of the band using filters, thereby improving the signal-to-noise ratio at the output of the circuit.

Figure 5:
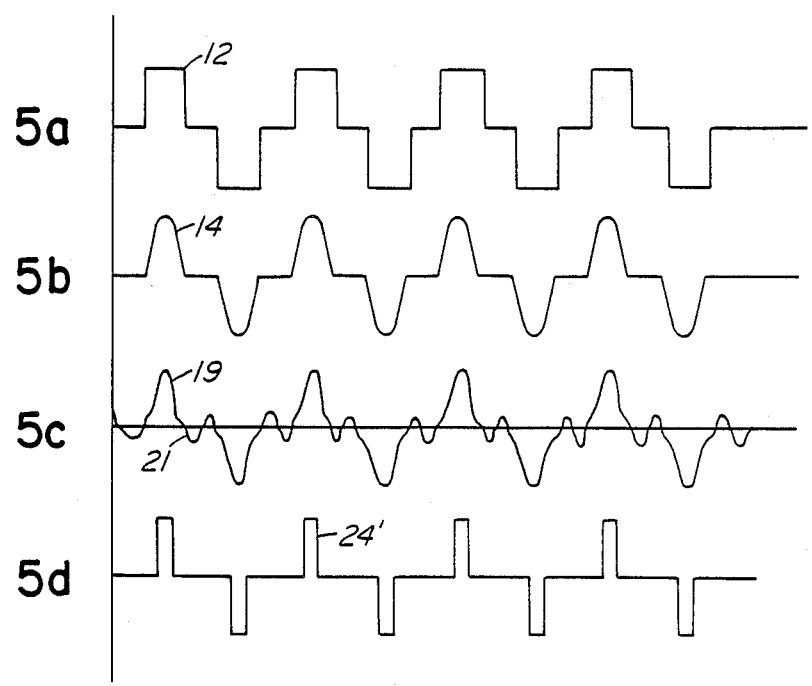
FIG. 5 illustrates various waveforms in the block diagrams.

The overall circuit shown in FIG. 1 will be understood to comprise a digital line receiver 10 having input terminals 11 for connection to a telephone line, not shown, conducting a bit stream of digital signals comprising AMI encoded pulses. Reference to FIG. 5a reveals a sample of the bit stream shown in idealized form as encoded bipolar pulses 12.

A pre-filter 13 applies initial filtering to the pulses 12 which results in a bit stream of pulses 14 that appear at an output 22 of the pre-filter 13. Comparing pulses 12 and 14 shows the effect of such pre-filtering. Although the pulses 14 lack the clean, square corners of the idealized pulses 12, the individual pulses 14 are clearly distinct and separate one from the other such that the receiver 10 can readily extract timing therefrom as, for example, by applying the pulses 14 to the input of a known phaselocked loop circuit, not shown.

Further processing of the pulses 14 is performed in an adaptive line equalizer 15, an output 16 of which produces a standard signal under various telephone line conditions. Here, for example, appropriate equalization occurs to compensate telephone line anomalies. A typical equalizer 15 is an automatic line build-out (ALBO) type which is known to those skilled in the art and requires no further description.

Further filtering which provides an enhanced signal-to-noise ratio at a binary data output 17 is performed in a forward filter 18 which is a conventional fixed filter.

The rationale behind using the filter 18 in the configuration shown is that sufficient filtering at the high end of the band will reduce noise bandwidth. The relationship of noise vs bandwidth may be seen in the following relations:

$$\frac{Bandwidth}{2} : \frac{Noise\ (volts)}{\sqrt{2}} \quad (1)$$

or $$\frac{Bandwidth}{2} : \frac{Noise\ Power}{2} \quad (2)$$

Note that the foregoing relations are true only if the noise response is flat with respect to bandwidth.

As a result of additional filtering in the filter 18, the pulses 14 are further distorted and appear as pulses 19 (FIG. 5c) at an output 20 of the filter. While the signal-to-noise ratio is enhanced by additional filtering, the further problem of ISI arises with the pulses 19 comprising four basic types; positive and negative pulses, each with a positive or negative interference tail as discussed in U.S. Pat. No. 4,545,060. The ISI interference to which the aforementioned patent refers is shown in FIG. 5c as an interference tail 21.

The generation of ISI closes the eye, as previously discussed, and it is the function of an adaptive decision feedback equalizer 25 to suppress ISI and reopen the eye following closure.

Figure 6:
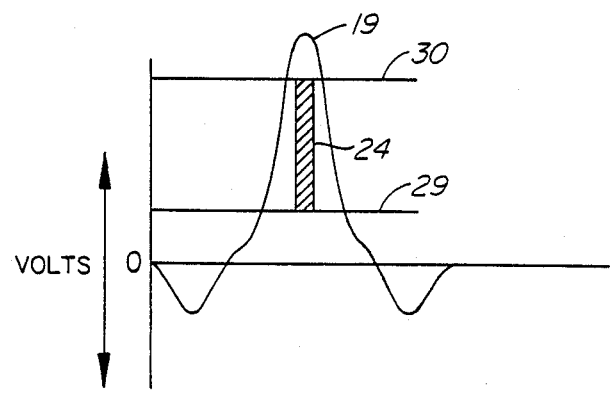
FIG. 6 is an enlarged view of one of the waveforms in FIG. 5.

Initially, the distorted pulses 19, exhibiting ISI, are coupled through a difference amplifier 26 to an input 23 of a quantizer 27 which samples the pulses 19 to differentiate between positive, zero and negative values. Under control of clock pulses at a clock input 28, the pulses are sampled at predetermined times and tested between low and high threshold voltage limits. Reference to FIG. 6 shows an enlarged view of a single pulse 19 and the sampling zone between a low threshold 29 and a high threshold 30. A resultant sampled slice 24 has enhanced signal-to-noise and the ISI therein has been removed. Thereafter the sampled slice is coupled to an input 35 of the equalizer 25.

A transfer function characteristic of the equalizer 25 is intended to duplicate that of the combined transfer characteristics of the filters 13 and 18, together with the equalizer 15, so that a signal at an output 36 is substantially equal to a corresponding signal at the output 20 in terms of ISI.

It will be observed that the output 20 is connected to a noninverting input 37 of the amplifier 26 whereas the output 36 is connected to an inverting input 38 thereof. Since the inputs 37 and 38, ISI generated in the equalizer 25 as a result of its transfer function should be equal to that appearing at the output 20 of the filter 18. Accordingly, the inputs 37 and 38 should have substantially the same ISI which is then cancelled in the amplifier 26. Ideally, therefore, binary data at the output 17 should be free of ISI and may also serve as an optional pickup point for timing as illustrated.

As previously described, however, because of the high distortion introduced, principally by the equalizer 15 and filter 18, convergence of the equalizer 25 cannot be guaranteed. This requires a special protocol or training sequence in the pulses 12 to initialize the receiver 10 which means that on any signal interruption, initialization using the special protocol or training sequence must be repeated.

Figure 2:
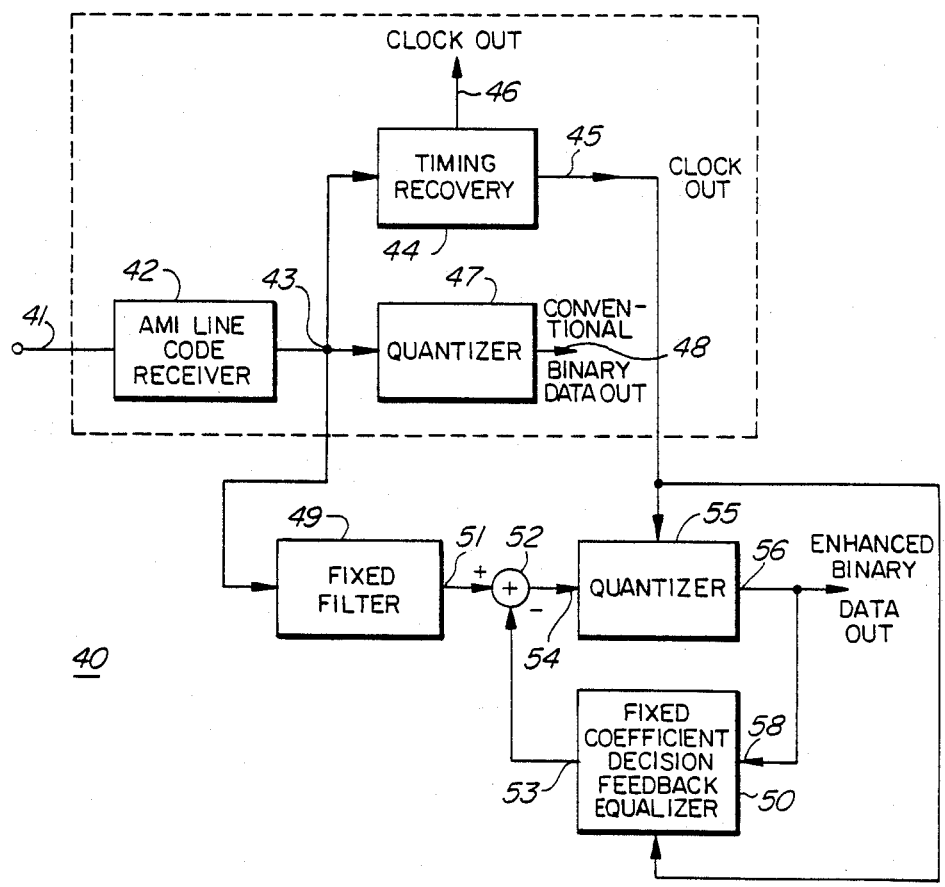
FIG. 2 is a block diagram of apparatus for reducing noise in a digital line receiver in which a nonadaptive DFE is employed for signal-to-noise ratio enhancement.

An improvement over the prior art is shown in FIG. 2 as a digital line receiver 40. Similar to the receiver 10, an input 41 is connectable to a telephone line, not shown, and receives a bit stream of encoded bipolar pulses 12 (FIG. 5a) which are applied to the input side of a conventional AMI line code receiver 42. It is known to those skilled in the art that the receiver 42 is capable of readily extracting timing information from the pulses 12 and that telephone line equalization and bridge tap equalization can be properly managed. It will be understood that an output 43 from the receiver 42 approximates the pulses 14 (FIG. 5b) that are produced as a standard signal under all cable conditions. Differing from the receiver 10, the output 43 is coupled to a known timing recovery circuit 44 from which clock outputs 45 and 46 are obtained. In the circuit hereinbelow described, the output 45 would occur at the baud rate of the pulses 12 whereas the output 46 would be equal to twice the baud rate.

The output 43 is also coupled to a quantizer 47 that functions in an identical manner to the quantizer 27 of FIG. 1. In this respect, therefore, an output 48 produces a bit stream of conventional binary data.

Since the output 43 produces a standard signal under all telephone line conditions, together with appropriate timing signals in the manner described, further conditioning of enhancement purposes does not require an adaptive filter nor a corresponding decision feedback equalizer of the type described in FIG. 1. Thus, instead of an adaptive type of equalizer filter, the receiver 40 utilizes a low-pass type of filter shown as a fixed filter 49 which filters out random high frequency noise appearing in the pulses 14. As described in the prior art circuit of FIG. 1, such filtering introduces ISI that results in an output signal similar to that of the pulses 19, each exhibiting interference tails 21. In this manner, the eye is closed by the filter 49. However, unlike the circuit of the prior art which relies on the adaptive equalizer 25, an equalizer 50 in the receiver 40 is of the fixed coefficient decision feedback type which does not exhibit the same problems as those experienced by the equalizer 25.

An output 51 from the filter 49 is shown coupled to a noninverting input of a difference amplifier 52 whereas an output 53 from the equalizer 50 is shown coupled to an inverting input of the amplifier 52. Only the difference of the amplifier 52 inputs is amplified so that a relatively simple adjustment of the fixed coefficient of the equalizer 50, to correspond to that of the filter 49, will result in substantially equal ISI quantities appearing at the inputs of the amplifier 52 which cancel out in the output thereof.

The output of the amplifier 52 is shown coupled to an input 54 of a quantizer 55 which functions in the same manner as the quantizer 27 of FIG. 1. Reference to FIG. 5d shows an idealized signal at an output 56 of the quantizer, which signal comprises enhanced binary data in the form of pulses 24'.

Each pulse 24' corresponds to an output slice 24 (FIG. 6) which is coupled to an input 58 of the equalizer 50. As previously described, the fixed coefficient of the equalizer 50 corresponds to a transfer function which is the same as that in the filter 49. As a result, signals at the output 53 are consequently degraded by ISI in the same manner as in the filter 49. The output 53 therefore produces a feedback signal at the inverting input of the amplifier 52 which is substantially equal to the signal at the noninverting input of the amplifier 52 in terms of ISI. Accordingly, ISI is substantially cancelled at the output 56, resulting in the enhanced binary data output having an improved noise reduction derived from the transfer function of the filter 49.

Figure 3:
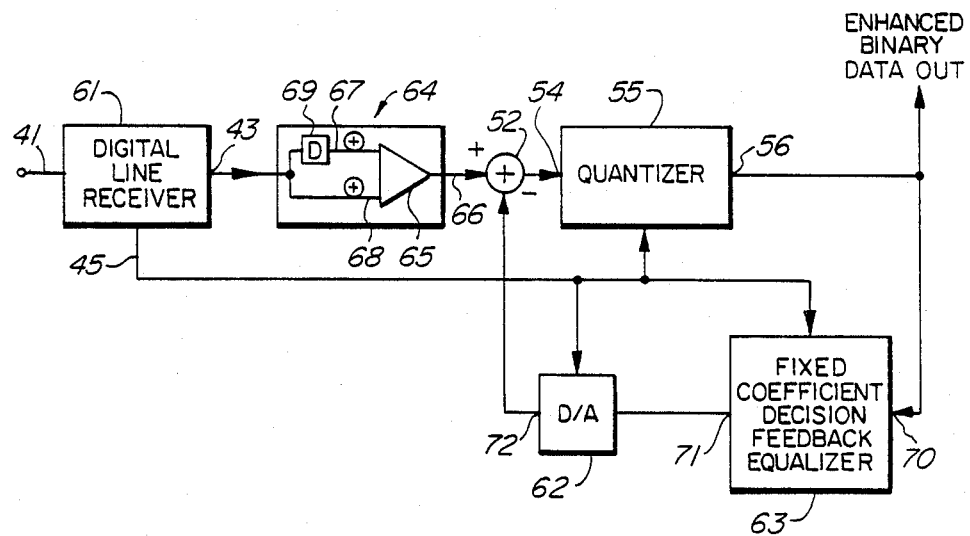
FIG. 3 is a block diagram of another embodiment of apparatus for reducing noise in a digital line receiver according to the invention.

Another embodiment of the invention is illustrated in block diagram form in FIG. 3. It will be understood therein that a digital line receiver 61 includes the receiver 42, the timing recovery circuit 44 and the quantizer 47 of FIG. 2. A single block is shown in FIG. 3 in the interests of brevity. In accordance with the preceding description of the receiver 42, the input 41 is connectable to a telephone line, not shown, the output 43 provides the equalized standard signal 14 and the output 45 provides the necessary clock output for timing a digital-to-analog converter 62 and a fixed coefficient decision feedback equalizer 63 having one tap.

The output 43 is shown coupled to the input side of an analog filter 64 having a predetermined transfer function which will be understood to comprise a partial response class 4 (PR 4) or modified Duo Binary (MDB). This transfer function is expressed mathematically as follows:

$$PR\ 4 = (1-D)(1+D)$$

where:

D = one bit delay

The expression $(1-D)$ of the aforenoted transfer function is provided by the transmitter, not shown, of the alternate mark inverted bitstream defined by this expression and which is applied to the input 41. The expression (1+D) and the resulting product of both expressions is provided in the circuit of FIG. 3.

It will be observed in FIG. 3 that the filter 64 comprises a summing amplifier 65 having an output 66 and two summing inputs 67 and 68. The input 68 is shown connected directly to the output 43 whereas the input 67 is shown connected indirectly to the same output through a delay circuit 69 that provides a necessary delay whereby any one pulse in the output 43 is added algebraically with the next following pulse in the amplifier 65 with the summed result appearing in the output 66.

Signals appearing in the output 66 are subsequently processed by a difference amplifier 52 and a quantizer 55, the latter producing an output of enhanced binary data in the form of pulses 24' (FIG. 5d) as described in the circuit of FIG. 2. Differing from that circuit, however, is the equalizer 63 having an input 70 connected to the output 56 and an output 71 connected to the input side of the converter 62. Thus, an analog output 72 therefrom is connected to the inverting input of the amplifier 52. Apart from the aforedescribed feedback loop, providing an analog output from the converter 62, as well as the predetermined transfer function provided by the filter 64, the circuits of FIGS. 2 and 3 function in the same manner.

Figure 4:
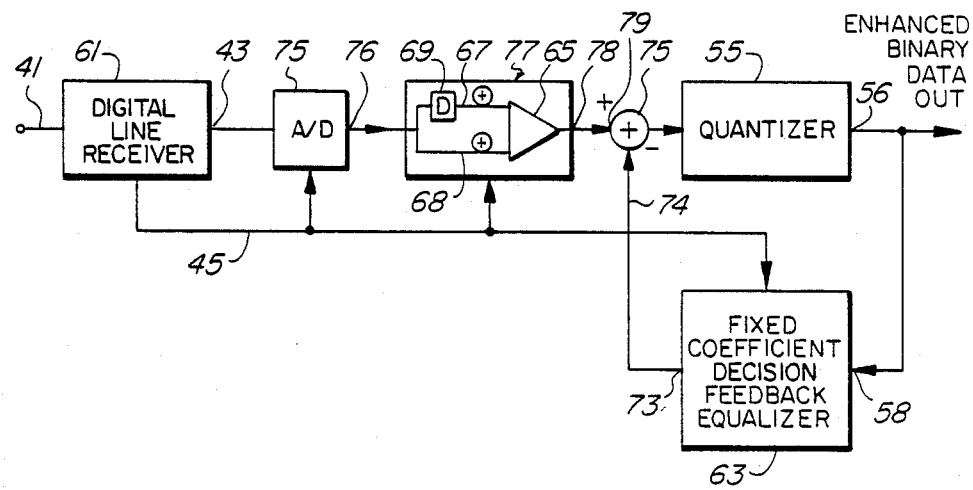
FIG. 4 is yet another embodiment of apparatus for reducing noise in a digital line receiver according to the invention wherein a fixed digital filter is employed.

Whereas the block diagram illustrated in FIG. 3 used an analog filter to produce a PR 4 (1+D) receiver, a circuit illustrated in block diagram form in FIG. 4 includes a digital filter to produce either a PR 4 (1+D) receiver or a receiver with higher order filtering. Similarity of structure is readily apparent and may be seen in the commonality of the receiver 61, the quantizer 55 and the equalizer 63 which in FIG. 4, includes a twelve bit output 73 connected to an input 74 of a digital adder 75.

It will be recalled from FIG. 2 that the receiver output 43 is an analog output. Accordingly FIG. 4 includes n eight bit analog-to-digital converter 75 having a digital output 76 connected to the input side of a twelve bit, fixed digital filter 77 having an output 78 connected to a second input 79 of the adder 75.

Functionally the same as the filter 64, the filter 77 likewise includes the summing amplifier 65 with its inputs 67 and 68. Corresponding to FIG. 3, the input 68 is connected directly to the output 76 whereas the input 67 is connected to the same output through the delay circuit 69.

Since the circuits of both FIG. 3 and FIG. 4 produce a PR 4 (1+D) receiver, the transfer function of both is the same as described in the receiver of FIG. 3. The signal-to-noise ratio is therefore enhanced in the output of the difference amplifier 52 or the digital adder 75, as the case may be, and ISI subsequently introduced by the filter and the filtering effect of the quantizer 55 in each instance, is reduced by the fixed coefficient decision feedback equalizer 63 as illustrated.

Improvements in signal-to-noise ratios may be increased by resorting to a higher order filter and a more complex fixed coefficient decision feedback equalizer. Both can be easily realized with the embodiment of FIG. 4. Since no adaption is necessary, both the filter 77 and the equalizer are easily realizable.

Examples of signal-to-noise ratio improvements with increasingly higher order filtering are shown below:

| Transfer Function | S/N Improvement (dB) | Frequency | DEF Tap |
|---|---|---|---|
| (1) $1 + \alpha D$ | 3.9 | 20 kHz | 1 |
| (2) $1 + \alpha D + \beta D$ | 5.2 | 18 kHz | 2 |
| (3) $1 + 0.9 D + 0.85 D \ldots$ | 13 | 13 kHz | 3 |

Note: 13 dB has been calculated as the theoretical maximum signal-to-noise improvement.

Having regard to the invention as described hereinabove, it will be apparent to those skilled in the art that the aforedescribed embodiments may be varied to meet particular specialized requirements without departing from the true spirit and scope of the invention disclosed. These embodiments are therefore not to be taken as indicative of the limits of the invention but rather as exemplary structures of the invention which is defined by the claims appended hereto.

The embodiments of the invention in which an exclusive property or privilege is claimed are defined as follows:

1. Apparatus for reducing noise in a digital line receiver having an input connectable to a telephone line conducting a bit stream of digital signals, a line equalizer operably connected between the input and corresponding output of the receiver, and timing recovery means having at least one clock output and an input connected to the receiver output, comprising in combination:
   amplifier means having first and second differential inputs and a difference output corresponding thereto;
      filter means connected between the receiver output and the first differential input for coupling equalized digital signals therebetween and substantially filtering out high frequency random noise present in the signals according to a predetermined fixed transfer function providing signal-to-noise enhancement of the signals and consequent degradation thereof by intersymbol interference;
      quantizer means operably responsive to the clock output and having a signal input connected to the difference output and an enhanced signal output producing a bit stream comprising a predetermined portion of individual ones of the enhanced signals excluding the intersymbol interference; and
      decision feedback equalizer means operably defined by said transfer function and connected between the enhanced signal output and the second differential input for generating feedback signals having intersymbol interference substantially equal to such interference at the first differential input, whereby the intersymbol interference is substantially diminished in the enhanced signal output.

2. Apparatus as claimed in claim 1 wherein the filter means comprises a nonadaptive partial response analog filter.

3. Apparatus as claimed in claim 2 wherein the fixed transfer function is one of, a partial response class 4 or a modified duo binary type.

4. Apparatus as claimed in claim 2 wherein the filter comprises:
   an amplifier having first and second summing inputs and a summed output corresponding thereto with the first summing input being connected directly to the output of the line equalizer; and signal delay means coupling the second summing input to the output of the line equalizer.

5. Apparatus as claimed in claim 4 wherein the delay means is operably responsive to a predetermined function for delaying individual ones of equalized digital signals coupled to the second summing input.

6. Apparatus as claimed in claim 5 wherein the predetermined function delays by one bit individual ones of equalized digital signals coupled to the second summing input.

7. Apparatus as claimed in claim 5 wherein the predetermined function is defined by one of the mathematical expressions $1 + \alpha D$ or $1 + \alpha D + \beta D$, where:

D = one bit delay $\alpha$ and $\beta$ = coefficients.

8. Apparatus as claimed in claim 7, further comprising a digital-to-analog converter having an input connected to an output of the decision feedback equalizer means and an output connected to the second differential input.

9. Apparatus as claimed in claim 7, further comprising an analog-to-digital converter having an input connected to the receiver output and an output connected to the first summing input and wherein the amplifier means comprises a digital adder.

10. Apparatus as claimed in claim 5 wherein the predetermined function is defined by the mathematical expression $1 + 0.9D + 0.85D$, where: D = one bit delay.

11. A method for reducing noise in a digital line receiver having an input connectable to a telephone line conducting a bit stream of digital signals, a line equalizer operably connected between the input and corresponding output of the receiver, timing recovery means having at least one clock output and an input connected to the receiver output, and amplifier means having first and second differential inputs and a difference output corresponding thereto, comprising the steps of:

coupling equalized digital signals from the receiver output to the first differential input and substantially filtering out high frequency random noise present in the signals according to a predetermined fixed transfer function providing signal-to-noise enhancement of the signals and consequent degradation thereof by intersymbol interference;

sampling the digital signals at the difference output at a rate corresponding to the clock output and producing a second bit stream comprising a predetermined portion of individual ones of the enhanced signals excluding the intersymbol interference;

generating feedback signals having parameters defined by said transfer function and corresponding to the second bit stream, the feedback signals having intersymbol interference substantially equal to such interference at the first differential input; and coupling the feedback signals to the second differential input, whereby the intersymbol interference is substantially diminished in the enhanced signal output.

12. A method for reducing noise in a digital line receiver as claimed in claim 11 wherein the filter means comprises a nonadaptive partial response analog filter.

13. A method for reducing noise in a digital line receiver as claimed in claim 12 where in the fixed transfer function is one of, a partial response Class 4 or a modified duo binary type.

14. A method for reducing noise in a digital line receiver as claimed in claim 11 wherein the filter means comprises:

an amplifier having a first and second summing inputs and a summed output corresponding thereto with the first summing input being connected directly to the output of the line equalizer; and signal delay means coupling the second summing input to the output of the line equalizer.

15. A method for reducing noise in a digital line receiver as claimed in claim 14 wherein the first step is preceded by the steps of:

coupling the equalized digital signals from the output of the line equalizer directly to the first summing input; and coupling the equalized digital signals from the output of the line equalizer indirectly to the second summing input through the signal delay means.

16. A method for reducing noise in a digital line receiver as claimed in claim 15 wherein the delay means delays by one bit individual ones of equalized digital signals coupled to the second summing input.

* * * * *